(12) United States Patent
Culbertson et al.

(10) Patent No.: US 11,550,346 B2
(45) Date of Patent: Jan. 10, 2023

(54) SMART HEATER SYSTEM

(71) Applicant: Watlow Electric Manufacturing Company, St. Louis, MO (US)

(72) Inventors: David P. Culbertson, Bristol, WI (US); Magdi Khair, San Antonio, TX (US); Julian Tan, Vernon Hills, IL (US); Mark Everly, St. Charles, MO (US)

(73) Assignee: WATLOW ELECTRIC MANUFACTURING COMPANY, St. Louis, MO (US)

( * ) Notice: Subject to any disclaimer, the term of this patent is extended or adjusted under 35 U.S.C. 154(b) by 142 days.

(21) Appl. No.: 16/786,218

(22) Filed: Feb. 10, 2020

(65) Prior Publication Data

US 2020/0174505 A1    Jun. 4, 2020

Related U.S. Application Data

(63) Continuation of application No. 14/263,177, filed on Apr. 28, 2014, now abandoned.

(60) Provisional application No. 61/816,346, filed on Apr. 26, 2013.

(51) Int. Cl.

| G05D 23/19 | (2006.01) |
|---|---|
| G05B 15/02 | (2006.01) |
| H05B 1/02 | (2006.01) |
| F01N 3/027 | (2006.01) |
| F01N 3/20 | (2006.01) |

(52) U.S. Cl.
CPC ............ *G05D 23/19* (2013.01); *F01N 3/027* (2013.01); *F01N 3/2013* (2013.01); *G05B 15/02* (2013.01); *H05B 1/0236* (2013.01); *F01N 2240/16* (2013.01); *F01N 2550/22* (2013.01); *F01N 2560/06* (2013.01); *F01N 2900/0408* (2013.01); *F01N 2900/1602* (2013.01); *Y02T 10/12* (2013.01)

(58) Field of Classification Search
None
See application file for complete search history.

(56) References Cited

U.S. PATENT DOCUMENTS

| 5,983,627 | A * | 11/1999 | Asik | F01N 13/009 |
|---|---|---|---|---|
| | | | | 60/274 |
| 6,232,585 | B1* | 5/2001 | Clothier | H05B 6/06 |
| | | | | 126/246 |
| 8,444,729 | B2* | 5/2013 | Bailey | B01D 46/46 |
| | | | | 55/282.3 |
| 2006/0047480 | A1* | 3/2006 | Lenz | G01K 1/024 |
| | | | | 702/183 |
| 2008/0028753 | A1* | 2/2008 | Wagner | F01N 3/0238 |
| | | | | 60/295 |

(Continued)

*Primary Examiner* — James D. Rutten
(74) *Attorney, Agent, or Firm* — Burris Law, PLLC

(57) ABSTRACT

A heating system includes a plurality of heater elements, a plurality of switches connected to the plurality of heater elements, a set of predetermined performance information including heater information specific for each heater element, at least one temperature sensor measuring temperature of at least one heater element from among the plurality of heater elements, and a heater control unit in communication with the temperature sensor(s). The heater control unit controls the heater elements differently, via the switches, based on the heater information and the measured temperature from the temperature sensor(s).

20 Claims, 8 Drawing Sheets

(56) References Cited

U.S. PATENT DOCUMENTS

2009/0107117 A1\* 4/2009 Chyo .................. B01D 46/448
　　　　　　　　　　　　　　　　　　60/286

\* cited by examiner

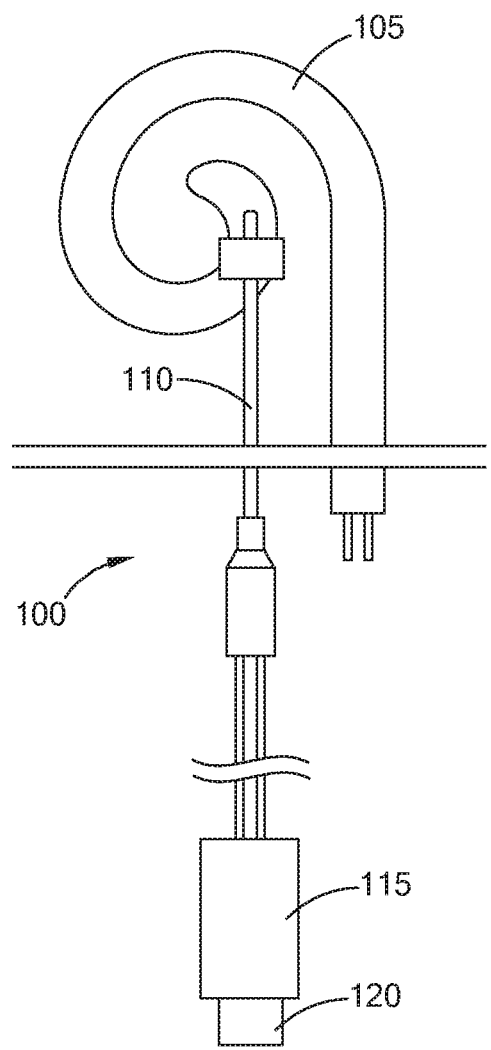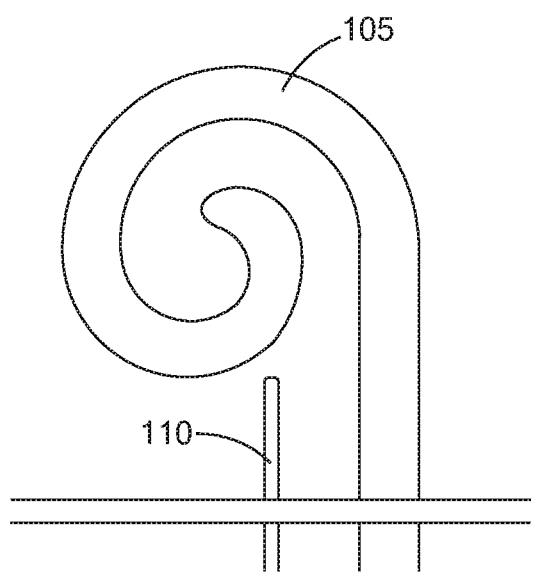
Fig. 1A
Fig. 1B

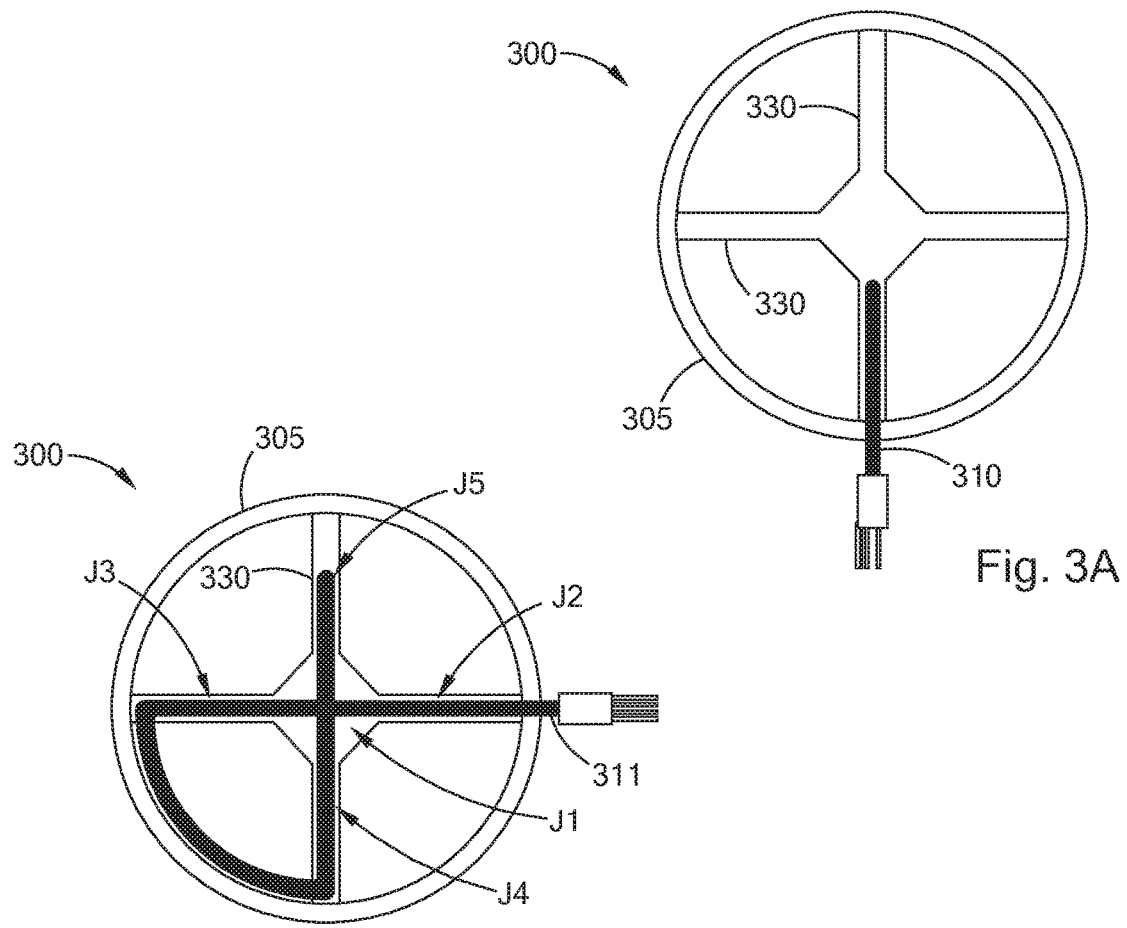
Fig. 3A
Fig. 3B
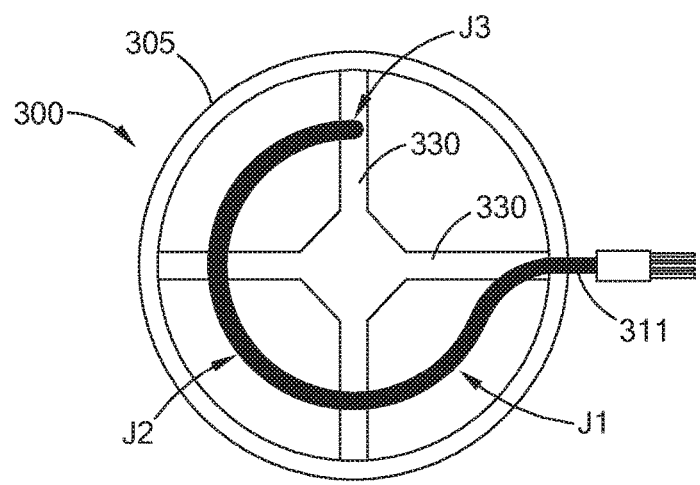
Fig. 3C

SMART HEATER SYSTEM

CROSS-REFERENCE TO RELATED APPLICATIONS

This application is a continuation of U.S. patent application Ser. No. 14/263,177, filed on Apr. 28 2014, which claims priority to and the benefit of U.S. Provisional Patent Application No. 61/816,346, filed on Apr. 26, 2013. The disclosures of the above applications are incorporated herein by reference.

FIELD

The present disclosure relates to temperature management. More specifically, this disclosure relates to systems and methods for measuring and compensating for heat transfer differences and other environmental heat transfer related aspects of thermal systems.

BACKGROUND

The statements in this section merely provide background information related to the present disclosure and may not constitute prior art.

Heat flux is a useful measure for predicting relative heater element performance, including temperature, transfer efficiency, and life-time. The flux density exhibited by a heater element is defined as Watt density (watts/mm$^2$), which represents a measure of the magnitude of the power that can be concentrated per square millimeter of an element's surface area. A heater element that exhibits a high Watt density will generally provide a fast temperature rise and a lower overall manufacturing cost due to the reduced amount of surface area that is required. However, these advantages are often off-set by the risk of reduced lifetime due to the higher surface temperatures that are encountered, as well as the potential for lower reliability (e.g., over-shooting the desired temperature condition, etc.).

During manufacturing, variances encountered in processing conditions and heater construction can result in differences in the heat flux that are exhibited within different portions of a single heater element or between the various heater elements that are produced. In order to compensate for this manufacturing variability, and ensure reliability at the expense of maximizing performance (e.g., rate of heating) and minimize cost (e.g., lowering the element's surface area), the industry conventionally applies a safety factor, which results in a reduction in the Watt density exhibited by the heater element.

SUMMARY

This section provides a general summary of the disclosure and is not a comprehensive disclosure of its full scope or all of its features.

The present disclosure provides a heating system comprising a plurality of heater elements, a plurality of switches connected to the plurality of heater elements, a set of predetermined performance information including heater information specific for each heater element, at least one temperature sensor measuring temperature of at least one heater element from among the plurality of heater elements, and a heater control unit in communication with the temperature sensor. The heater control unit controls the plurality of heater elements differently, via the plurality of switches, based on the heater information and the measured temperature from the at least one temperature sensor.

In one form, the heating system further comprises at least one support bracket in contact with at least one heater element among the plurality of heater elements.

In another form, the set of predetermined performance information includes sensor information that includes a measurement of temperature conditions at a location adjacent to the at least one heater element, and/or switch information that includes a measurement of current and voltage, rate of heating associated with solid state components of the plurality of switches as a function of an amount of electrical current that is being switched, or a combination thereof.

In another form, the set of predetermined performance information is stored as at least one of written text, a bar code, a data matrix, and a radio frequency identification (RFID) tag.

In a further form, the heater information for each of the plurality of heater elements includes at least one of a rate of heating at a desired voltage, a rate of heating under a specified flow condition, heater resistance, heater stability, temperature profile, flow uniformity, and temperature conditions in a location adjacent to the plurality of heater elements.

In another form, the heating system further includes a plurality of temperature sensors to measure temperatures of the plurality of heater elements.

In still another form, the temperature sensor(s) is a thermocouple, a thermistor, or a resistive temperature device.

In yet another form, the heating system further comprises a signal conditioning module in communication with the temperature sensor(s) and is configured to process, at least one of, sensor time response and sensor contact resistance to a sheath of the at least one heater element. According to this form, the signal conditioning module may be configured to store the heater information for the plurality of heating elements.

In other various forms, the plurality of switches are controlled by a switch control unit that is in communication with the heater control unit, and/or a resistance of each of the plurality of heating elements varies with temperature.

The present disclosure further provides a method of providing thermal control in a system that includes a plurality of heater elements. The method includes providing a set of predetermined performance information including heater information specific for each of the plurality of heater elements, acquiring temperature from at least one temperature sensor regarding at least one heater element from among the plurality of heater elements, and controlling the plurality of heater elements differently via a plurality of switches based on the heater information and the acquired temperature from the at least one temperature sensor, wherein the plurality of switches are coupled to the plurality of heater elements to control power to the plurality of heater elements.

In one form, the method further comprises supporting a heater element from among the plurality of heater elements with a support bracket in contact with the heater element.

In another form, the set of predetermined performance information includes sensor information that includes a measurement of temperature conditions at a location adjacent to the at least one heater element, and/or switch information that includes a measurement of current and voltage, rate of heating associated with solid state components of the plurality of switches as a function of an amount of electrical current that is being switched, or a combination thereof.

In another form, the set of predetermined performance information is stored as at least one of written text, a bar code, a data matrix, and a radio frequency identification (RFID) tag.

In a further form, the heater information, for each of the plurality of heater elements, includes at least one of a rate of heating at a desired voltage, a rate of heating under a specified flow condition, heater resistance, heater stability, temperature profile, flow uniformity, and temperature conditions in a location adjacent to the plurality of heater elements.

In still another form, a resistance of each of the plurality of heating elements varies with temperature.

In another form, the method further comprises reducing power to the at least heater element from among the plurality of heater element when the temperature of the at least one heater element is greater than or equal to a predetermined temperature limit, wherein the heater information includes predetermined temperature limit for each of the plurality of heater elements.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1A is a pictorial representation of a smart heating system constructed according to the teachings of the present disclosure;

FIG. 1B is a pictorial representation of another smart heating system constructed according to the teachings of the present disclosure;

FIGS. 3(A-C) are pictorial representation of smart heating systems constructed with a mounting bracket;

Figure 2:
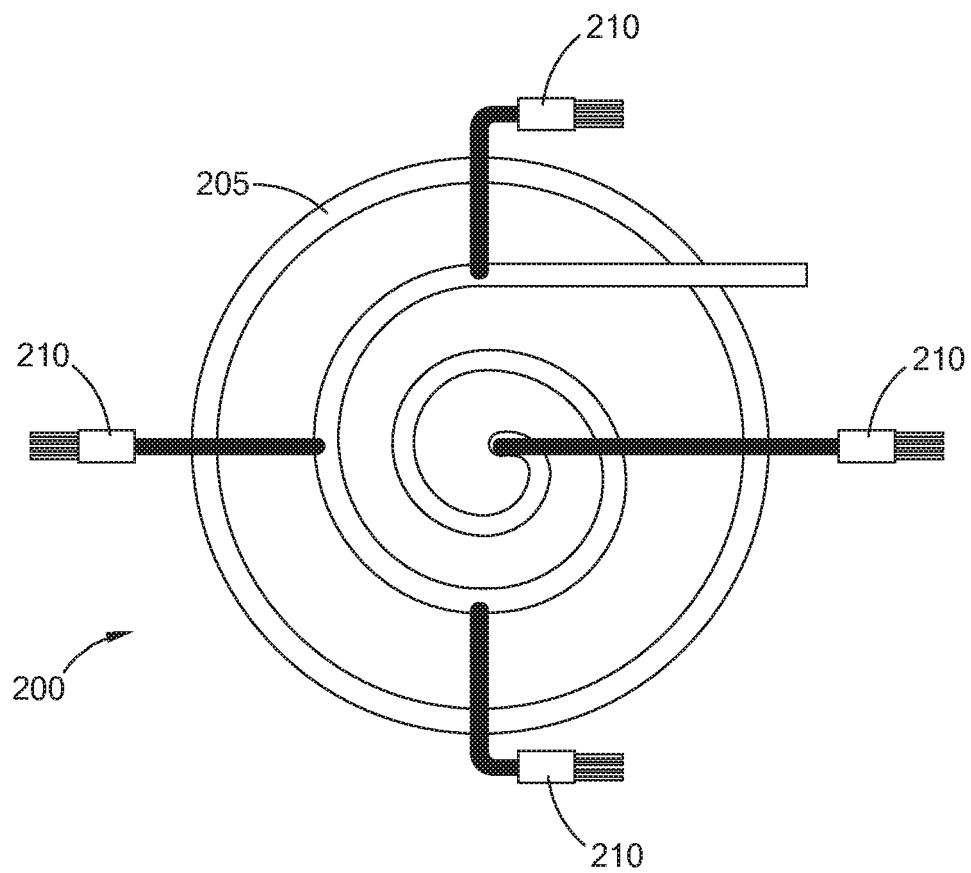
FIG. 2 is a pictorial representation of another smart heating system constructed with multiple sensors.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure generally relates to a smart heating system and a method of use associated therewith. The smart heating system made and used according to the teachings contained herein is described throughout the present disclosure in conjunction with diesel exhaust applications in order to more fully illustrate the concept. The incorporation and use of smart heating system in conjunction with other types of thermal management applications is contemplated to be within the scope of the disclosure.

The following specific embodiments are given to illustrate the design and use of smart heating systems according to the teachings of the present disclosure and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

A smart heating system general comprises at least one heater element with predetermined (e.g., measured) or predictable performance characteristics. One example of such performance characteristics includes the rate of heating for the heater element when it is exposed to a preselected voltage or under a specified process flow condition. Although the average performance for multiple heater elements of the same or substantially similar design that are manufactured by the same process under similar process conditions represents valuable information, the measurement or knowledge of how each individual heater element in the system performs allows one to control the system's overall performance with respect to fast heating without sacrificing overall reliability. One specific example of a performance characteristic for a heater element that can be used to control a system's overall performance includes, without limitation, the locations associated with any non-uniformity in sheath temperature as shown by the temperature profile exhibited by the heating element under a known or predetermined flow/process condition.

A smart heating system provides the benefits of enhanced diagnostic capability in addition to maximizing heat flux and lowering manufacturing cost. A robust diagnostic capability often depends on the variation exhibited from heater element to heater element. A system that is capable of using performance characteristics or information for specific heater elements provides for enhanced diagnostic capability by allowing at least a portion of the random variation that arises from manufacturing variances to be corrected or compensated for.

The specific characteristics or information can be stored in any known format that is desirable, including but not limited to written text, bar codes, data matrix, and radio frequency identification (RFID), as well as being communicated on a digital bus or any other information or communication method known to one skilled in the art.

According to one aspect of the present disclosure, the smart heating system may comprise at least one heater element or alternatively, a combination of at least one heater element and at least one temperature sensor. The sensor may be in contact with the sheath of the heater element (see FIG.

1A), located on a bracket adjacent to the heater element, or located upstream or downstream of the heater element (see FIG. 1B). The sensor is capable of measuring the temperature in a specific or desired location of the heater element. The measurement of temperature by the sensor allows the system to reduce power when the heater element is approaching or surpassing a predetermined temperature limit established according to the application being performed.

Referring to FIGS. 1A and 1B, one specific combination of the smart heating system 100 is shown that comprises a tubular heater 105 and a thermocouple 110. The thermocouple 110 can be in contact with or attached to the sheath of the heater element 105 (FIG. 1A) or located adjacent to the heater element 105 (FIG. 1B). One skilled in the art will understand that other types of heaters and sensors, may be used without exceeding the scope of the present disclosure. Optionally, the thermocouple 110 may be in communication with or attached to a signal conditioning module 115 that is capable of storing and/or processing information, such as, without limitation, sensor time response, sensor contact resistance to the heater's sheath, heater's maximum temperature limit, maximum ramp rate for the heater, heater resistance, and the heater's temperature profile or distribution map, as well as the difference in temperature between the heater and the area adjacent to the heater. The maximum temperature limit and the maximum ramp rate may be determined for a specific heater 105 and sensor 110 combination using conventional testing and inspection of the combination.

Since the signal conditioning module 115 may comprise an input and output (I/O), an analog to digital converter (ADC), and a microprocessor, it is possible to use said module to make or communicate other measurements, including but not limited to, the magnitude of current leakage to ground, as well as the voltage and/or current applied to the heater. The measurement of current leakage is useful for determining if the heater insulation resistance (IR) is low and can be used to adjust the rate of applying voltage to the heater in order to remove moisture and/or extend the lifetime of the heater. The measurement of the applied voltage and/or current can be used to determine Power and heat flux associated with the smart heating system 100, as well as to detect the occurrence of any defects or faults.

Still referring to FIG. 1, a signal conditioning module 115 with digital communication capability may alternatively be used. Such digital communication capability may include the use of a local interconnect network (LIN) bus or controller area network (CAN) bus, as well as any other digital bus known to one skilled in the art. The digital bus receives measurements, such as temperature, current leakage, voltage, current, etc. from another device that is in communication with the bus through the use of an integral connector 120, which in turn allows the signal conditioning unit 115 to become aware of and use this information instead of information that itself had measured.

According to another aspect of the present disclosure, the types of information collected and/or communicated may be utilized to enhance control of the heater system with respect to performance. For example, the information may be used to calculate (a) control parameters to avoid over temperature conditions associated with the heater; (b) a slow ramp for voltage at low current (I)-resistance (R) conditions in order to allow moisture to be evaporated; or (c) a diagnostic limit designed to prolong the lifetime of the heater system. An example of such a diagnostic limit (DL), may include the calculation of the change in temperature ($\Delta T$) per unit time ($\Delta t$) per a predetermined variable (x) as shown in Equation 1. This predetermined variable (x) is selected based upon the specific application in which the smart heating system is being used. In certain applications, this variable (x) may be the applied voltage, the amount of fuel used, or the mass flow of an exhaust, among others.

$$DL=[(\Delta T/\Delta t)/x] \qquad \text{Eq. 1}$$

According to another aspect of the present disclosure, the smart heating system may comprise more than one temperature sensor. Referring now to FIG. 2, a smart heating system 200 having a heater 205 in contact with more than one temperature sensor 210, alternatively, multiple sensors 210, alternatively, at least three sensors 210 is shown. The use of multiple sensors 210 allows the smart heating system 200 to measure temperature at several locations of the heater element 205, thereby, allowing calculation of differences in the measured locations. The calculation of these temperature differences provides for more precise control of the heater element 205 thereby increasing lifetime, as well as avoiding any damage resulting from localized over-heating.

In many applications, thermal gradients will exist in the environment to which the smart heating system is exposed. For example, thermal gradients may exist within a diesel oxidation catalyst (DOC) that can vary as a function of time and/or engine condition. Thermal gradients may also exist in other after treatment components, such as diesel particle filters (DPF), selective catalytic reducers, or lean NOx traps, among other components present in the exhaust stream that include an after-treatment catalyst. At least part of the function of an after-treatment catalyst is to facilitate a chemical reaction with the exhaust gases in order to reduce pollutants to comply with emission regulations. Since such chemical reactions have a dependency on temperature, a variation or gradient in temperature will affect the rate at which these reactions proceed. The use of a smart heating system 200 can improve the performance of the after-treatment component by effectively controlling the temperature at a level that facilitates the occurrence of the chemical reaction.

Still referring to FIG. 2, in a diesel exhaust system, a smart heating system 200 with multiple sensors 210 is exposed to exhaust gases. In this application, the smart heating system 200 can detect variations in temperature caused by thermal flow distribution of the exhaust gases and compensate or adjust accordingly in order to maximize the performance and/or lifetime of the heater element 205. Thus sensor information includes a measurement of temperature conditions in a location adjacent to the heater element 205. A similar arrangement with a single sensor is also shown in FIG. 1B. The use of multiple sensors 205 can also be used to measure or predict additional diagnostic conditions when used in various applications. A few examples of which include the measurement of temperature gradients (i) downstream in a diesel particulate filter (DPF) in order to determine non-uniform soot build-up in the DPF; (ii) downstream of a diesel oxidation catalyst (DOC) in order to identify the occurrence of non-uniform oxidation or face-plugging of the DOC; and (iii) upstream of a DOC in order to identify non-uniform temperatures so that more accurate energy balance calculations can be obtained.

According to another aspect of the present disclosure, the smart heating system may further comprise a support bracket. In some applications, such as in a diesel exhaust system, among others, the vibrations arising from the application may be to such a degree that at least one support bracket is necessary to mount the smart heating system.

Referring now to FIG. 3(A), each mounting bracket 330 may be used to support a heating element 305 of the smart heating system 300. When desirable the temperature sensor 310 may also be supported by one of the brackets 330. When multiple sensors 310 are utilized, each sensor 330 may be in contact with a bracket 330.

Alternatively, a junction sensor 311 may be utilized (FIGS. 3B & 3C) with such sensor 311 being in contact with the bracket 305 in multiple locations. A junction sensor 311 provides multiple temperature measurements. As shown in FIG. 3B, the specific junction sensor 311 shown provides for a temperature measurement at the center of the heater can (junction J1) and at four other locations (junctions J2-J5). In FIG. 3C, a smart heating system 300 is shown with a bracket 330 providing support for a heater element 305 and a junction sensor 311 that provides for temperature measurement at three locations (junctions J1-J3). One skilled in the art will understand that many other different sensors 310, 311 and bracket 305 combinations may be utilized without exceeding the scope of the present disclosure.

In general, a smart heating system 300 that has multiple sensors 310, 311 measuring temperature commands better performance, lower heater cost, greater reliability and enhanced diagnostic capability than a similar sensor comprising a single sensor 310. The use of a junction sensor 311 may become a lower cost alternative as compared to the use of multiple individual sensors 310.

Figure 4A:
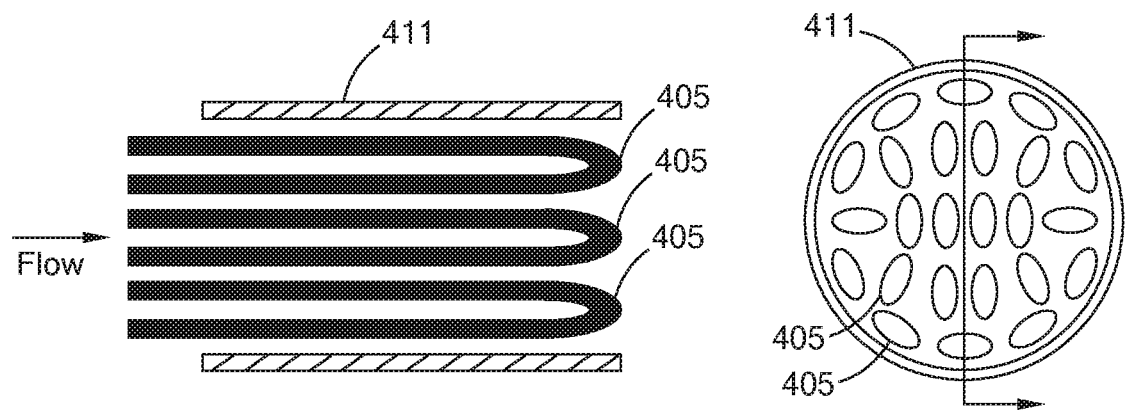
FIGS. 4(A-C) are pictorial representations and cross-sectional views of multiple heater elements used in a smart heating system in a diesel exhaust application.
Figure 4B:
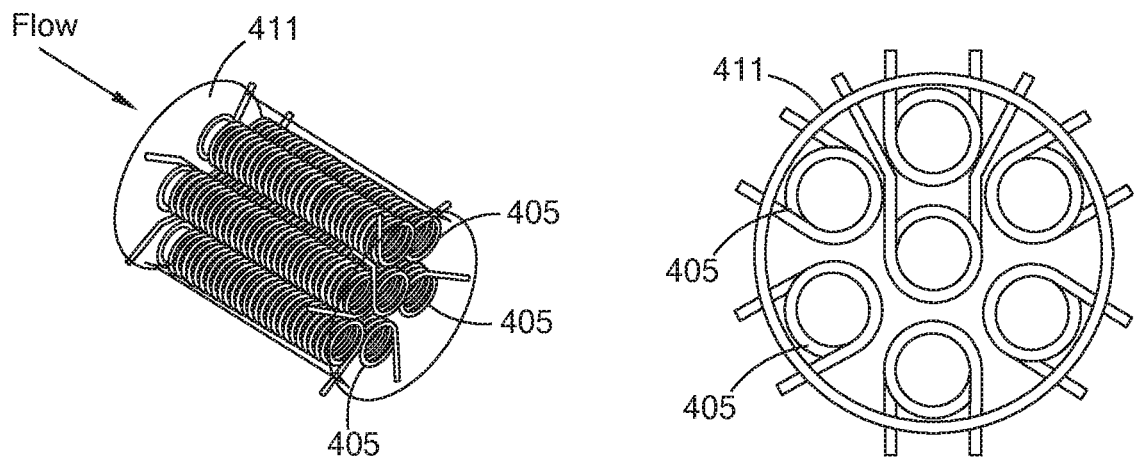
Figure 4C:
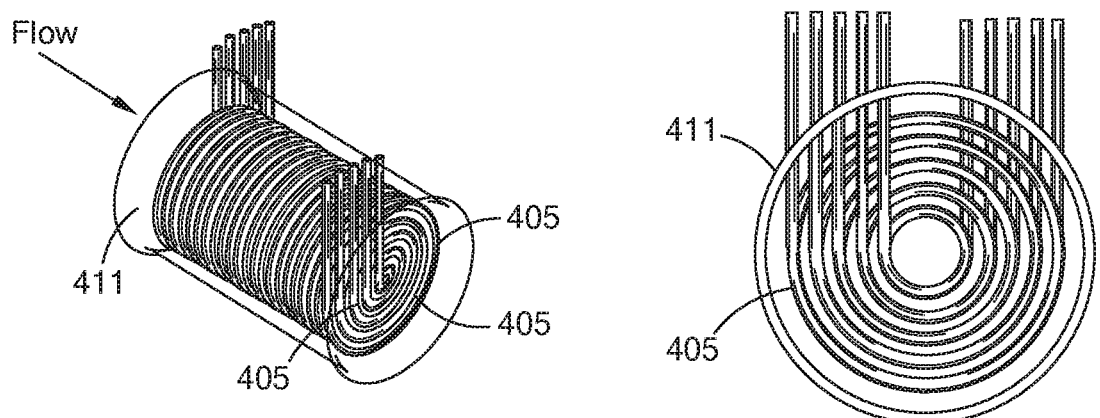

Referring now to FIGS. 4(A-C), the smart heating system 400 may comprise multiple heater elements 405. In FIG. 4A, multiple circulation heater elements 405 having a U-shaped bend are shown in an exhaust component 411. In FIGS. 4B and 4C, multiple circulation heater elements 405 are shown that have a circular shape. Multiple heater elements 405 can be used to create a desired temperature profile. For example, all of the heater elements 405 could be powered at the same time or alternated such that uniform temperature is established in the exhaust/after treatment system 411 in order to facilitate the chemical reaction. Alternatively, some of the heater elements 405 can be fabricated and powered at different levels in order to create a different amount of heat and to modify the thermal gradient that exists within the exhaust or after treatment component 411. Several specific examples in which heater elements create different amounts of heat include (a) providing heater elements 405 located on the periphery with a different amount of power than those located in the interior of the exhaust component 411; and (b) providing heater elements 405 located in different quadrants with in the exhaust component 411 in order to control thermal gradients on a quadrant by quadrant basis. Alternatively, heater elements 405 may be placed only around the periphery of the exhaust component 411 in order to establish a single heating zone that can be used to reduce or improve radial temperature gradients.

Similar to the use of multiple heaters, the use of multiple sensors located in predetermined places based on their ability to add value in measuring the thermal gradient. The temperature sensors can be thermocouples, thermistors, resistance temperature devices, and any other known means of measuring or detecting temperature. A heater element having a resistance that varies with temperature may be used as a 2-wire heater/sensor combination. The heater element may include without limitation cable heaters, tubular heaters, cartridge heaters, flexible heaters, layered heaters, metal foils, metal fleece heaters, or any other type of heater known to one skilled in the art.

Figure 5:
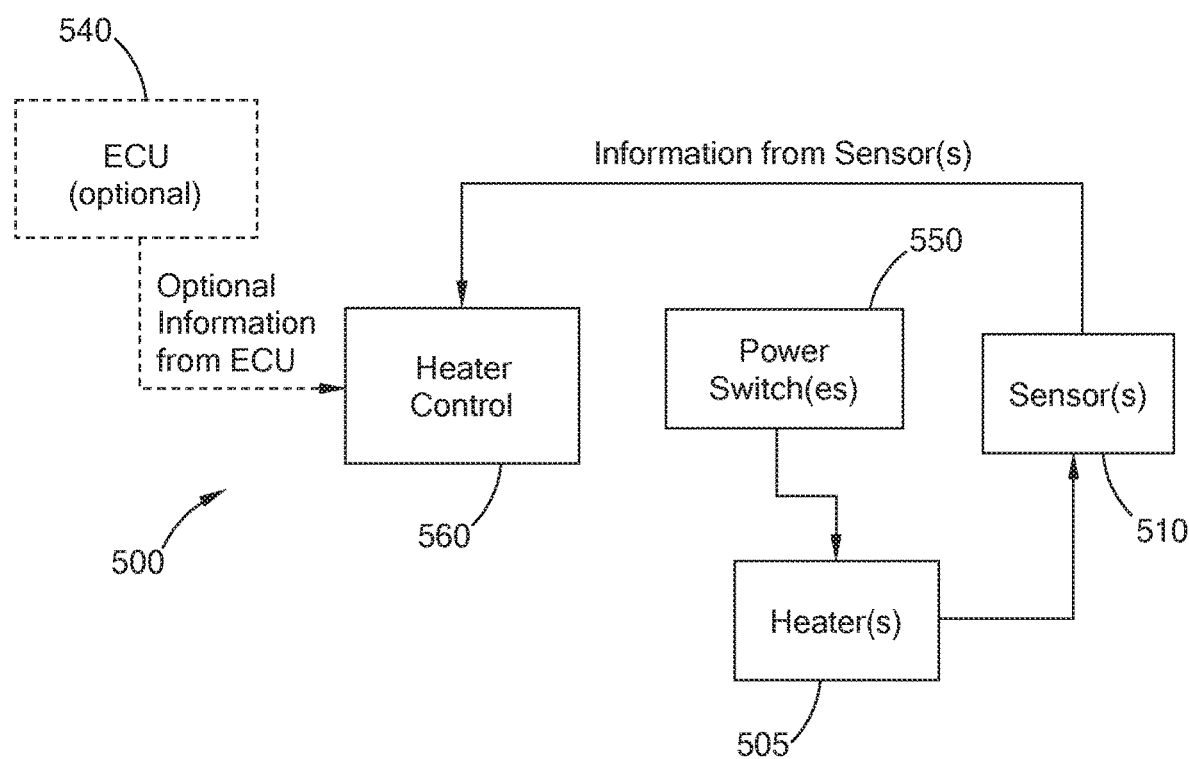
FIG. 5 is a schematic representation of a smart heating system design.

Referring now to FIG. 5, one specific example of a smart heating system 500 designed for controlling temperature is shown. In this system 500 design, the heater element 505 receives power from a switch 550 that can be actuated using signal(s) from the heater control unit 560. The heater control unit 560 receives information from one or more sensors 510 and/or an electronic control unit 540. Based on the information, the heater control unit 560 communicates with the power switch 550 and relays the power to the heater element 505. The power switch 550 relays may be integrated into the heater control unit 540 when desirable. The heater elements 505 are distributed so that they are capable of providing a preferred or desirable temperature profile in the after treatment exhaust system in order to enhance performance of the after treatment system. Enhanced performance with respect to a diesel exhaust system includes without limitation improved $NO_x$ production by the diesel oxidation catalyst (DOC) or in a catalyzed diesel particulate filter (DPF); improving ammonia storage or $NO_x$ conversion, or improving other chemical reactions.

Figure 6A:
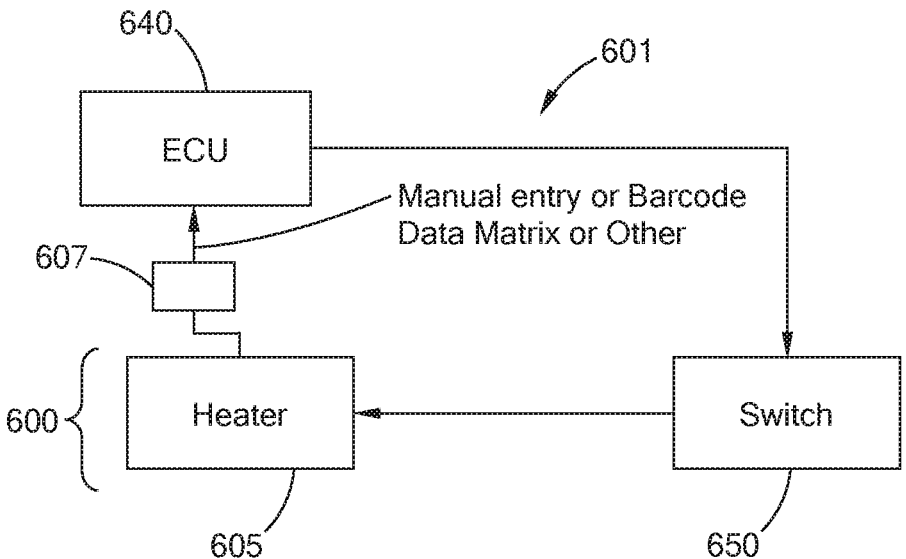
FIGS. 6(A-B) are schematic representations of other smart heating systems designed to use heater information.
Figure 6B:
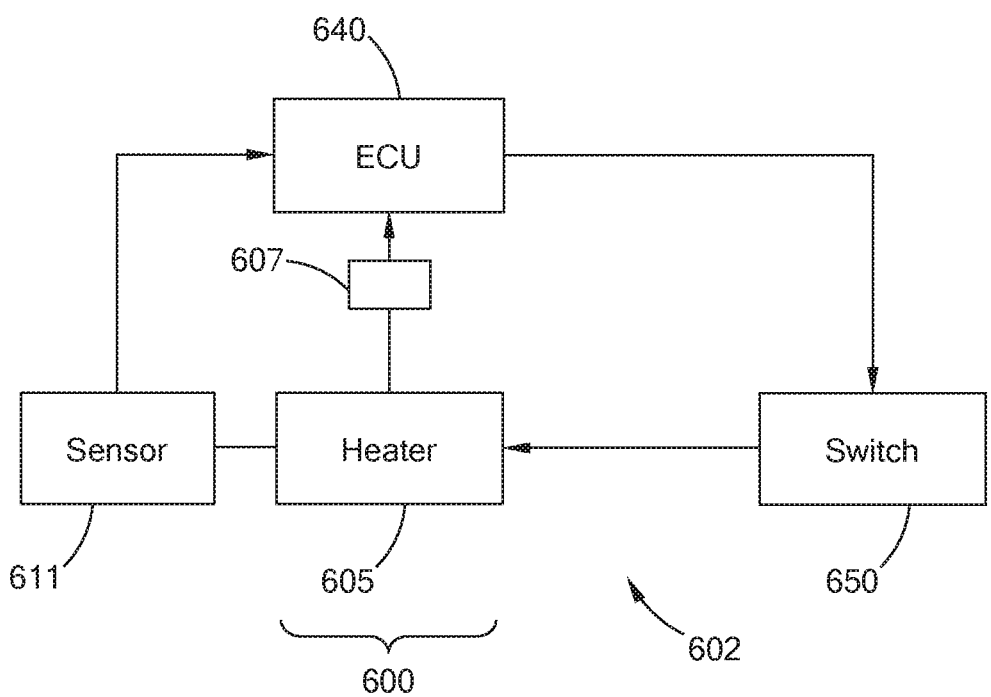

During the construction of a smart heating system, the heater may be mounted with the information related to the heater attached to the heater assembly via a barcode, data matrix, RFID tag, or any other known method. Such heater information may include, among others, rating of heating, resistance, maximum voltage as a function of time, etc. Referring now to FIG. 6A, the smart heating system 600 may be utilized via an open loop control mechanism 601. In this mechanism 601, the smart heating system 600, which includes a heater 605 along with its related information 607, is in communication with an electronic control unit (ECU) 640. The heater information 607 may be either manually or automatically communicated to the ECU 640 or to a switching device 650 to enable better use of the heater 605. A similar benefit associated with using the heater information 607 equally applies to a closed loop control mechanism 602 as described in FIG. 6B that incorporates an external temperature sensor 611.

Figure 7A:
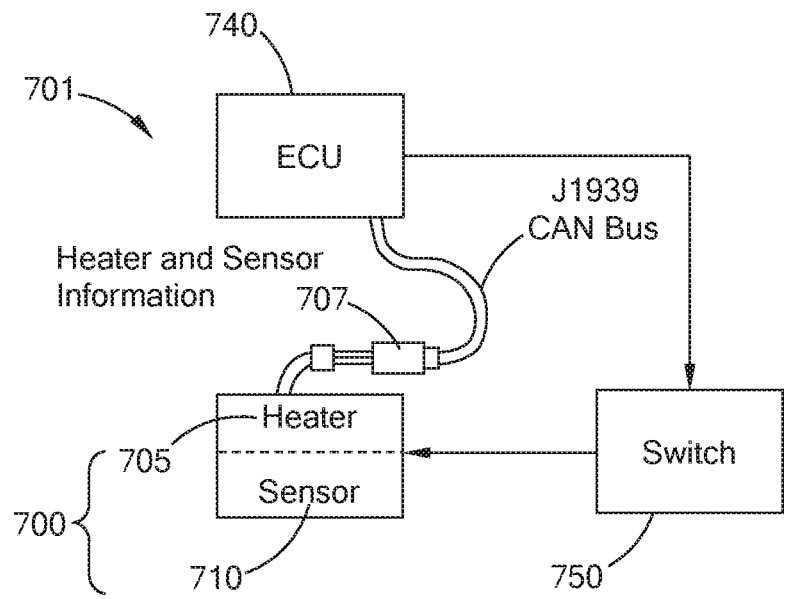
FIGS. 7(A-B) are schematic representations of other smart heating systems designed to use heater and sensor information.
Figure 7B:
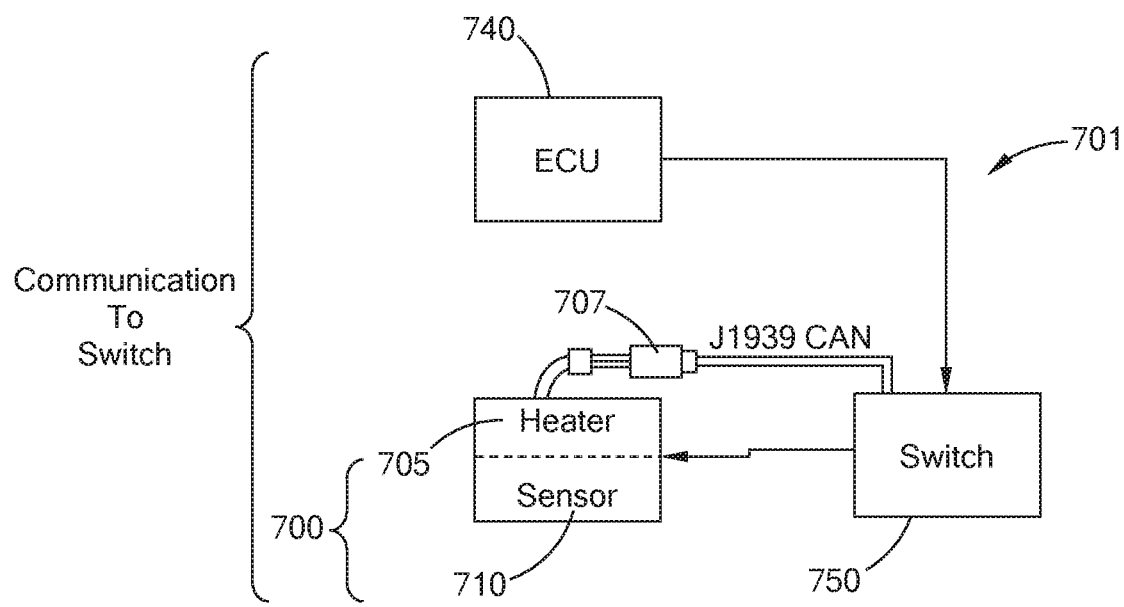

Alternatively, a smart heating system can be utilized that includes information about both the heater and temperature sensor(s). Referring now to FIGS. 7A and 7B, a smart heating system 700 that includes both a heater 705 and sensor 710 combination that is marked with both heater and sensor information 707 as previously described above for a smart heating system 600 that includes only heater information 607 (see FIG. 6) or if the sensor is an active sensor with a signal conditioning module (not shown), the information 707 may be stored in the memory of the conditioning module. The heater-sensor information 707 is communicated to an ECU 740 (FIG. 7A) or to a power switch 750 (FIG. 7B) in order to enhance the utilization of the smart heating system 700. Although the smart heating system 700 is shown in FIGS. 7A & 7B to be utilized in a closed loop control mechanism 701, one skilled in the art will understand that an open loop control mechanism (not shown) may also be utilized as another option.

Figure 8A:
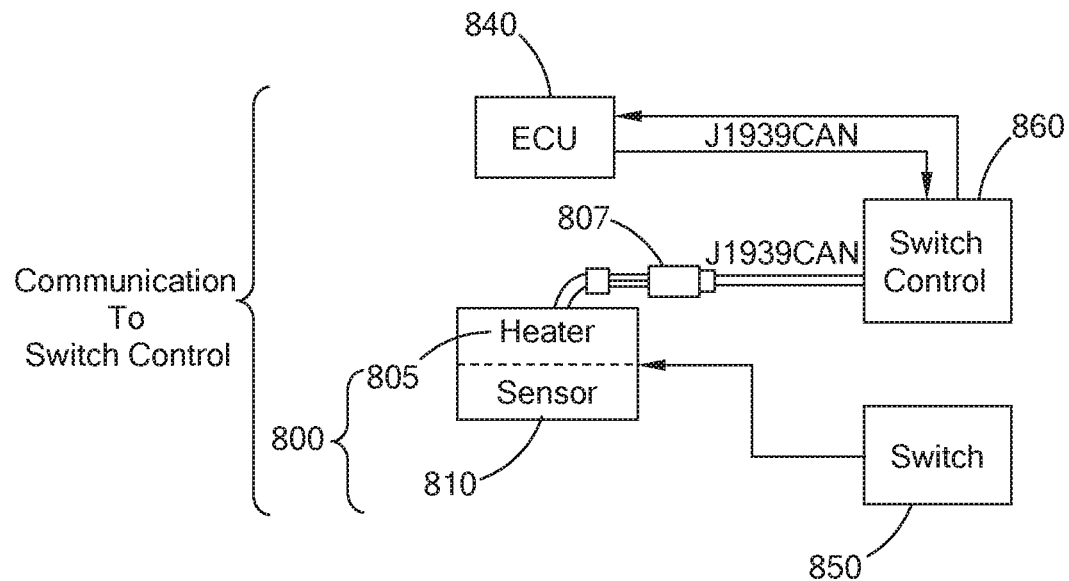
FIGS. 8(A-B) are schematic representations of other smart heating systems designed with power switch control.

Referring now to FIG. 8A, a third option for using heater-sensor information 807 is to communicate this information 807 to another control unit 860 that controls the functionality of the power switch 850. Optionally, the switch control 860 may also be in communication with the ECU 840. Alternatively, as shown in FIG. 8B, the information 808 concerning the switch 850 can be incorporated with the switch control 860 for use along with the heater-sensor information.

Figure 8B:
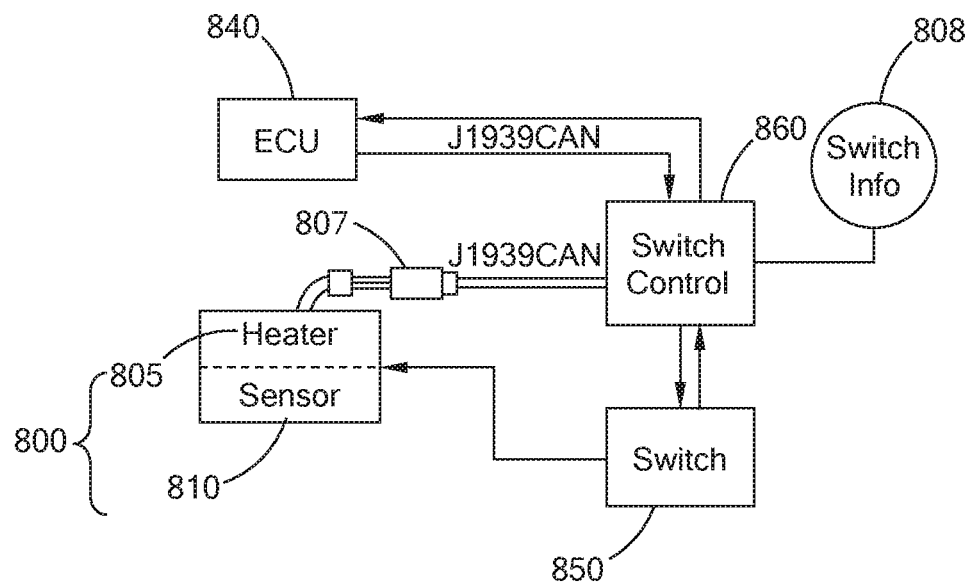

Still referring to FIG. 8(B), the switch information 808 may include without limitation, a measurement of the current and/or voltage, as well as the rate of heating associated with the solid state components of the switch 850 as a function of the amount of electrical current that is being switched. The rate of heating associated with the sensor 810 junction in contact with the switch 850 can be determined based on the electrical current (I) and the ability of the switch 850 to dissipate heat away from the junction. One skilled in the art will understand the relationship of this current (I) to the resistance (R) associated with a heater element 805 resulting in what is known as $I^2R$ heating. Thus the current to temperature relationship of the heater element 805 can be measured and stored as heater information 807. At a predetermined fluid flow condition, which can be communicated to the ECU 840, the smart heater system 800 comprising a heater 805, sensor 810, and switch 850 can be used to compare the rate of fluid temperature change to the rate of change in the switch 850 temperature in order to diagnose if the system 600 is operating efficiently.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A heating system comprising:
a plurality of heater elements;
a plurality of switches connected to the plurality of heater elements;
a set of predetermined performance information including heater information specific for each heater element;
at least one temperature sensor measuring temperature of at least one heater element from among the plurality of heater elements; and
a heater control unit in communication with the at least one temperature sensor, wherein the heater control unit controls the plurality of heater elements differently, via the plurality of switches, based on the heater information and the measured temperature from the at least one temperature sensor.

2. The heating system according to claim 1 further comprising at least one support bracket in contact with at least one heater element among the plurality of heater elements.

3. The heating system according to claim 1, wherein the set of predetermined performance information includes sensor information that includes a measurement of temperature conditions at a location adjacent to the at least one heater element.

4. The heating system according to claim 1, wherein the set of predetermined performance information includes switch information, wherein the switch information includes a measurement of current and voltage, rate of heating associated with solid state components of the plurality of switches as a function of an amount of electrical current that is being switched, or a combination thereof.

5. The heating system according to claim 1, wherein the set of predetermined performance information is stored as at least one of written text, a bar code, a data matrix, and a radio frequency identification (RFID) tag.

6. The heating system according to claim 1, wherein the heater information, for each of the plurality of heater elements, includes at least one of a rate of heating at a desired voltage, a rate of heating under a specified flow condition, heater resistance, heater stability, temperature profile, flow uniformity, and temperature conditions in a location adjacent to the plurality of heater elements.

7. The heating system according to claim 1 further comprising a plurality of temperature sensors to measure temperatures of the plurality of heater elements.

8. The heating system according to claim 1, wherein the at least one temperature sensor is a thermocouple, a thermistor, or a resistive temperature device.

9. The heating system according to claim 1 further comprising a signal conditioning module in communication with the at least one temperature sensor and configured to process, at least one of, sensor time response and sensor contact resistance to a sheath of the at least one heater element.

10. The heating system according to claim 9, wherein the signal conditioning module is configured to store the heater information for the plurality of heating elements.

11. The heating system according to claim 1, wherein the plurality of switches are controlled by a switch control unit that is in communication with the heater control unit.

12. The heating system according to claim 1, wherein a resistance of each of the plurality of heating elements varies with temperature.

13. A method of providing thermal control in a system including a plurality of heater elements, the method comprising:
providing a set of predetermined performance information including heater information specific for each of the plurality of heater elements;
acquiring temperature from at least one temperature sensor regarding at least one heater element from among the plurality of heater elements; and
controlling the plurality of heater elements differently via a plurality of switches based on the heater information and the acquired temperature from the at least one temperature sensor, wherein the plurality of switches are coupled to the plurality of heater elements to control power to the plurality of heater elements.

14. The method according to claim 13 further comprising supporting a heater element from among the plurality of heater elements with a support bracket in contact with the heater element.

15. The method according to claim 13, wherein the set of predetermined performance information includes sensor information that includes a measurement of temperature conditions at a location adjacent to the at least one heater element.

16. The method according to claim 13, wherein the set of predetermined performance information includes switch information, wherein the switch information includes a measurement of current and voltage, rate of heating associated with solid state components of the plurality of switches as a function of an amount of electrical current that is being switched, or a combination thereof.

17. The method according to claim 13, wherein the set of predetermined performance information is stored as at least one of written text, a bar code, a data matrix, and a radio frequency identification (RFID) tag.

18. The method according to claim 13, wherein the heater information, for each of the plurality of heater elements, includes at least one of a rate of heating at a desired voltage, a rate of heating under a specified flow condition, heater resistance, heater stability, temperature profile, flow uniformity, and temperature conditions in a location adjacent to the plurality of heater elements.

19. The method according to claim 13, wherein a resistance of each of the plurality of heating elements varies with temperature.

20. The method according to claim 13 further comprising reducing power to the at least heater element from among the plurality of heater element when the temperature of the at least one heater element is greater than or equal to a predetermined temperature limit, wherein the heater information includes predetermined temperature limit for each of the plurality of heater elements.

* * * * *